United States Patent [19]

Loomis et al.

[11] Patent Number: 4,972,082
[45] Date of Patent: Nov. 20, 1990

[54] METHODS AND APPARATUS FOR EPITHERMAL NEUTRON LOGGING

[75] Inventors: William A. Loomis, Ridgefield, Conn.; David J. Le Poire, Woodridge, Ill.; William B. Nelligan, North Bay Village, Fla.

[73] Assignee: Schlumberger Technology Corporation, New York, N.Y.

[21] Appl. No.: 324,776

[22] Filed: Mar. 16, 1989

[51] Int. Cl.$^5$ ............................................. G01V 5/10
[52] U.S. Cl. .................................. 250/269; 250/262; 250/266; 250/267; 250/268
[58] Field of Search ............... 250/262, 266, 267, 268, 250/269

[56] References Cited

U.S. PATENT DOCUMENTS

| | | | |
|---|---|---|---|
| 2,991,364 | 7/1961 | Goodman | 250/262 |
| 3,497,692 | 2/1970 | Mills, Jr. | 250/392 |
| 3,546,512 | 12/1970 | Frentrop | 313/61 |
| 4,047,027 | 9/1977 | Bateman et al. | 250/264 |
| 4,097,737 | 6/1978 | Mills, Jr. | 250/269 |
| 4,241,253 | 12/1980 | Allen et al. | 250/390.01 |
| 4,266,126 | 5/1981 | Mills, Jr. | 250/264 |
| 4,268,749 | 5/1981 | Mills, Jr. | 250/269 |
| 4,283,624 | 8/1981 | Mills, Jr. | 250/264 |
| 4,302,669 | 11/1981 | Allen et al. | 250/264 |
| 4,409,481 | 10/1983 | Smith, Jr. et al. | 250/276 |
| 4,423,323 | 12/1983 | Ellis et al. | 250/264 |
| 4,524,274 | 6/1985 | Scott | 250/269 |
| 4,581,532 | 4/1986 | Givens et al. | 250/266 |
| 4,625,110 | 11/1986 | Smith | 250/269 |
| 4,692,617 | 9/1987 | Allen et al. | 250/270 |
| 4,760,252 | 7/1988 | Albats et al. | 250/269 |
| 4,814,611 | 3/1989 | Moake | 250/269 |

FOREIGN PATENT DOCUMENTS 0203690 3/1986 European Pat. Off. .

OTHER PUBLICATIONS

Mills et al., "Pulse Neutron Porosity Logging, " Presented at SPWLA 29th Ann. Logging Symposium (jun. 5-8, 1988).
Mills et al., "Pulse Neutron Porosity Logging Based on Epithermal Neutron Die-Away", Presented at IAEA Research Coord. Meeting, Ottawa, Can. (Nov. 2-6, 1987).

Primary Examiner—Constantine Hannaher
Attorney, Agent, or Firm—Brumbaugh, Graves, Donohue & Raymond

[57] ABSTRACT

The porosity of an earth formation is derived in a plused neutron logging tool by use of a directionalized and borehole-shielded eptithermal neutron detector array and by processing detector count rate measurements of the epithermal neutron die-away curve in accordance with a multi-parameter fit to obtain as one parameter the epithermal neutron decay time of the formation and as a second parameter an indication of detector standoff (environmental) effects. The multi-parameter fitting procedure separates the formation and standoff effects on the measured count vs time curve, and yields a decay time measurement that is primarily representative of formation porosity and substantially free of environmental effects. To enhance count rate statistics, the neutron source and one or more of the epithermal neutron detector may be located at the same depth in the borehole. The neutron burst centroid is monitored an used to define a fiducial window for processing the die-way curve data.

57 Claims, 8 Drawing Sheets

METHODS AND APPARATUS FOR EPITHERMAL NEUTRON LOGGING

BACKGROUND OF THE INVENTION

The present invention relates generally to epithermal neutron logging and, more particularly, to improved methods and apparatus for determining the epithermal neutron decay time (die-away rate) and the porosity of an earth formation free of borehole environmental effects.

Neutrons are used effectively in the measurement of formation porosity because hydrogen strongly affects neutron moderation and because rock pore space is nearly always filled with hydrogen-rich fluids, i.e., hydrocarbons and/or water. In one type of neutron porosity logging tool, the fundamentally strong response of neutron scattering and transport to hydrogen content is exploited by measuring count rates at one or more distances along the borehole from a neutron source. Such tools typically include a chemical neutron source and one or, more commonly, two detectors of the thermal, epithermal or gamma-ray type. The count rates are correlatable with porosity, either individually or by taking a ratio of two count rates.

An early tool of this type employed a single epithermal neutron detector in a pad applied mechanically against the borehole wall. This sidewall device had the advantage of reducing borehole size effects on the porosity measurement, but could be disturbed by detector standoff due to the presence of mudcake between the pad surface and the borehole wall. Subsequent tools used a ratio of two detector count rates to obtain first order compensation for such borehole environmental effects. Low neutron flux, with consequent low counting rates, and radiation hazards, however, were and are a continuing problem with these tools. Sensitivity of the count rate ratio to formation lithology is also a perturbing effect and, with thermal neutron or capture gamma ray detection, so is the effect of thermal neutron absorbers as well.

More recently, tools using accelerator neutron sources have been developed. Although affording more intense neutron fluxes and safer operating conditions than chemical sources, the higher neutron energies (14 MeV) produced by such tools result in a decreased sensitivity of the count rate ratio to porosity above the 20%–25% range. This disadvantage of previous accelerator-based tools was addressed by Albats and Antkiw in U.S. Pat. No. 4,760,242, issued July 26, 1988 and entitled "Well Logging Tool With Accelerator Neutron Source". In addition to the count rate ratio technique, Albats and Antkiw also disclose a technique for deriving porosity from a cross plot of two epithermal neutron count rates. The tool includes nearspaced and far-spaced epithermal detectors, with the near-spaced detector being specially shielded to sensitize it to borehole environmental effects and to desensitize it to formation porosity. The output of the near-spaced detector, therefore, is useful for compensating for borehole environmental effects whether porosity is determined by the ratio technique or the cross plot technique.

In another type of neutron porosity logging tool, the strong neutron response to hydrogen is observed by detecting the die-away or decay of the formation epithermal neutron population following a burst of high energy neutrons. The time-dependent measurement of the epithermal neutron population die-away affords advantages of reduced lithology effect and an enhanced porosity sensitivity relative to count rate comparisons. Various techniques for implementing the basic die-away measurement have been proposed.

For example, U.S. Pat. Nos. 4,097,737 and 4,266,126 to Mills disclose the detection of the epithermal neutron population die-away in a plurality of successive time gates between neutron bursts and the comparison of ratios of count rates from successive gates to identify the time gates falling on the linear (exponential) portion of the die-away curve. The time gates thus identified are then used to derive the epithermal neutron decay die-away rate, or decay time, of the formation on the basis of a single exponential decay function. The epithermal die-away rate is an indication of the amount of hydrogenous matter present in the formation and, hence, of the porosity of the formation. Only a single epithermal neutron detector is required.

Again, in U.S. Pat. No. 4,283,624, Mills discloses measuring the decay time of epithermal neutrons using two detectors of different energy sensitivities relative to the chemical binding energy of bound hydrogen in the formation. The two decay rate measurements purport to distinguish between free hydrogen (as found in water or oil) and bound hydrogen (as chemically or otherwise immobilly bound to rock surfaces) and purportedly provide a porosity measurement based on free hydrogen content alone. The successive time gate technique of the earlier Mills Pat. Nos. 4,097,737 and 4,266,126 is employed to derive each of the two decay constants from the linear portions of the die-away curves measured at the two detector energies. The assumption of single-exponential decay of the epithermal neutron population made in the Mills' patents, however, does not always adequately account for borehole environmental effects encountered in actual logging conditions.

The still more recent U.S. Pat. No. 4,625,110 to Smith discloses a single-detector epithermal neutron porosity logging system in which both early and later parts of the die-away curve following relatively short neutron bursts are detected and analyzed on the basis that the detected curve represents the sum of two substantially independent neutron populations, one in the borehole and one in the formation, which are assumed to decay exponentially at different rates. This short burst two-exponential system explicitly seeks to detect the borehole component of the die-away curve and to improve the statistical precision of the formation decay time measurement. Although the sonde is decentralized in the borehole, the system is still susceptible to the effects of neutron scattering within the borehole contents since the detector is neither eccentered within the sonde nor back-shielded against borehole neutrons. Detector count rates are degraded by the axial spacing of the detector from the neutron source and by the use of intervening high density shielding.

The foregoing and other disadvantages of prior art neutron porosity logging techniques and systems are overcome by the present invention.

SUMMARY OF THE INVENTION

In accordance with the invention, the epithermal neutron decay time, and thus the porosity, of an earth formation is determined by measuring the die-away of the epithermal neutron population following a high-energy neutron burst in a manner to minimize the influence thereon of detector standoff and other environmental effects and then processing the measured die-away curve data in accordance with a multi-parameter fitting function which effectively separates the formation (decay time) effect on the measured curve from any residual standoff (environmental) effects. Gross or first order borehole effects are minimized by eccentering the epithermal detector or detectors within the borehole and shielding the active volume of each detector against neutrons incident thereon from all directions except the formation. The active dimensions of each detector are preferably not greater than a few typical mean free epithermal neutron path lengths to take full advantage of the good inherent spatial resolution of epithermal neutron slowing down time measurements. Although only a single epithermal neutron detector is required, an array of such detectors is preferred to extend the area over which data are acquired. This may be done without loss of resolution in the individual detectors, and affords the opportunity for enhancing count rate statistics or the directivity of investigation by grouping selected detector outputs together.

In a preferred embodiment, the epithermal neutron detector array is carried by an externally mounted pad which is itself composed of the neutron-shielding media. The shielding media preferably comprise a combination of a 1/v-type neutron absorber and an hydrogenous neutron-moderating material, the combined effect of which is to moderate fast neutrons to the thermal energy level and then absorb them within the body of the shielding media. Such a neutron shielding media permits the pad and detector array to be located opposite the neutron generator, i.e., at the same longitudinal position along the logging sonde, without undue thermal neutron background interference, thereby substantially improving detector count rate statistics. The individual detectors preferably are of the 3 He type pressurized to at least 10 Atm for maximum efficiency, and are clad by 40 to 60 mils (approximately 1 to 1.5 mm) of cadmium to further decrease sensitivity to thermal neutrons.

In addition to the epithermal neutron detector(s), a neutron source monitor, preferably a plastic scintillator, is located near the neutron generator for purposes of monitoring the neutron burst profile. Information of the time of occurrence and shape of the burst is determined and included in processing the measured epithermal neutron die-away curves to account for the effect of fluctuation, or drift, in the burst parameters.

The measured epithermal die-away curves are analyzed by fitting them to a multi-parameter exponential function including one time-constant parameter representative of the formation decay time and at least one additional parameter representative of the effect of detector standoff and other environmental effects. The general form of the multi-parameter fitting function is $$N(t) = N_o e^{(-t/A + B/t \ldots)} + K \tag{1}$$

where N(t) is the epithermal neutron count at time t, $N_o$ is the epithermal neutron count at an initial time $t_o$, e is the Napierian logarithm base, A is the epithermal neutron decay time constant, B is a parameter representing standoff (environmental) effects, and K is a function of background. The background function K may take the form of a constant background count, or, alternatively, the K term may take the form $K^*C(t)$, where C(t) is a general form for a background non-constant time curve, preferably measured with a thermal neutron detector. In the latter case, K is a fitted parameter which normalizes the background. Additional terms, e.g., $C/2_t2$, $D_3_t3$, etc., may be added to the exponential when needed to better fit the measured data. The singular nature of the reciprocal t terms in the fitting function at $t=0$ does not cause a problem because the fitting interval does not include $t=0$. Also, the background may be measured and subtracted from the epithermal neutron count data, or otherwise accounted for, in which case the K term may be omitted from the fitting function. The decay time parameter A is directly related to and correlatable with formation porosity and is substantially independent of lithology. The multi-parameter fitting form effectively separates the formation slowing down time effect on the measured die-away data from the effect of standoff, thereby providing a standoff-compensated decay time measurement.

Because the time relationship of the measured epithermal neutron die-away curves to the neutron bursts giving rise to such curves may vary in practice due to drift or other change in the neutron burst profile, one or more reference time parameters of the burst, preferably its centroid or trailing edge and also the burst width, are computed and compared to fiducial reference values for those parameters to ascertain the magnitude of any change in the burst character. In the case of changes in the timing of the centroid or trailing edge, the die-away curves are shifted in time to maintain the desired time relationship between the curves and the neutron burst. Preferably, this is accomplished by adjusting the start time of a fiducial fitting window by the appropriate amount and in the appropriate direction, as determined, for example, from a comparison of the computed burst centroid to the fiducial reference time for the burst centroid. In the case of unacceptable changes in the burst width, this situation can be flagged and appropriate action taken.

BRIEF DESCRIPTION OF THE DRAWINGS

For a better understanding of the invention, reference may be made to the following description of representative embodiments thereof and to the drawings, in which.

DETAILED DESCRIPTION OF THE ILLUSTRATED EMBODIMENTS

Figure 1:
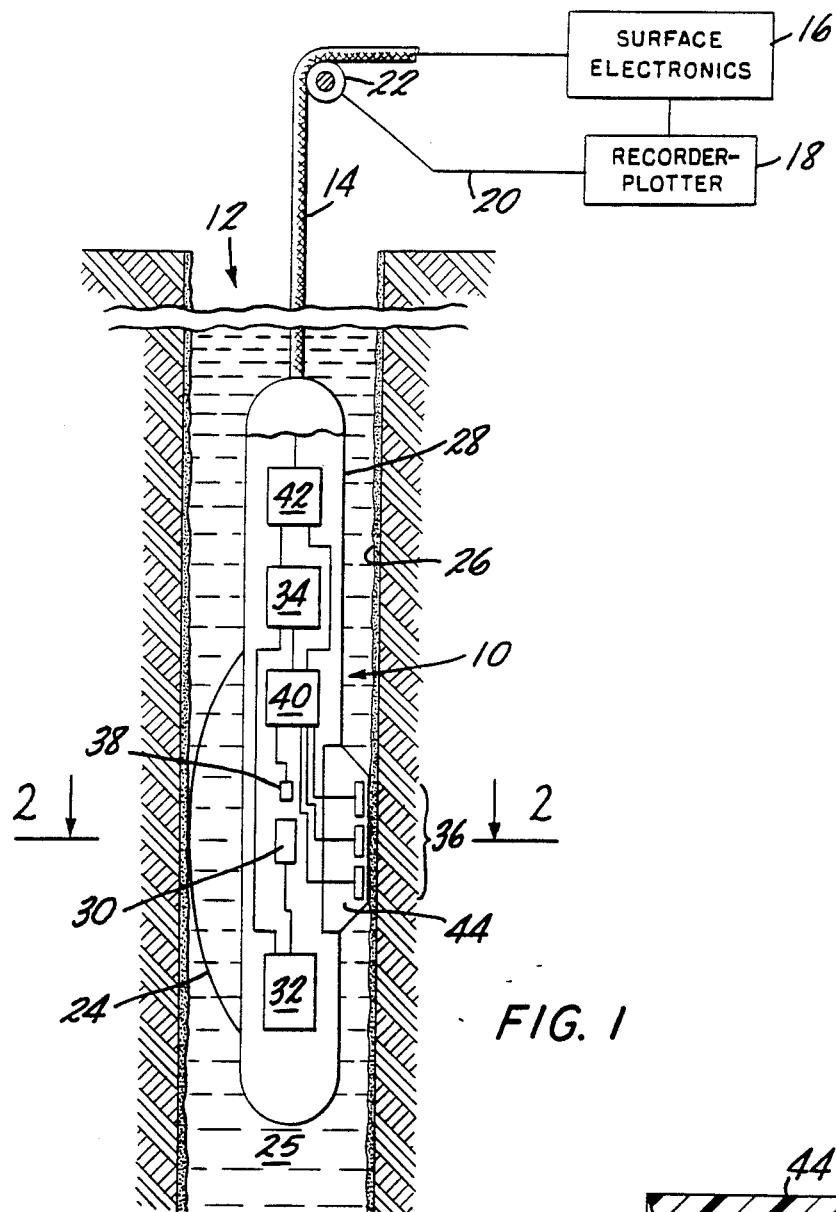
FIG. 1 is a schematic illustration of one embodiment of well logging apparatus for performing epithermal neutron logs in a well borehole in accordance with the invention.

In the illustrative embodiment of the invention depicted in FIG. 1, a well logging tool for performing epithermal neutron decay time and porosity logging of subsurface earth formations is illustrated as including a downhole sonde 10 suspended in a borehole 12 by an armored cable 14. The cable 14 connects the downhole sonde to surface equipment including a surface electronics package 16, preferably comprising a truck or skid-mounted digital computer and associated peripherals, and a recorder-plotter 18 for making the customary visual and/or magnetic record of the measured parameters vs. depth in the well bore. For that purpose, the recorder/plotter 18 is electrically or mechanically coupled, as indicated schematically by the line 20, to a cable-following sheave wheel 22.

The sonde 10 is intended to be a sidewall tool, and therefore a bow spring 24 or other decentralizing device is provided to urge the sonde against the sidewall of the borehole 12. The borehole 12 is illustrated as an open hole, containing a fluid 25 and having a mud cake 26 formed on the wall thereof. Although the tool is primarily intended for open-hole logging, it may be used in cased holes as well. The sonde 10 includes a pressure and temperature resistant housing 28 which includes, preferably adjacent the lower end thereof, a neutron generator 30 and an associated control and high-voltage power supply section 32. The neutron generator 30 preferably is of the deuterium-tritium accelerator type known in the art, see, for example, U.S. Pat. No. 2,991,364 to Goodman and U.S. Pat. No. 3,546,512 to Frentrop. The pertinent portions of the '364 and '512 patents are hereby incorporated by reference. Signals for controlling the operation of the neutron generator 30 and high-voltage section 32 are transmitted to those units from a sonde programmer section 34, as is described more fully hereinafter.

A detector array 36 for measuring the die-away of the epithermal neutron population in an earth formation 37 surrounding the well bore 12 is located opposite the neutron generator 30, i.e., at substantially the same longitudinal position along the length of the sonde 10. Such close spacing of the detector array 36 to the neutron generator 30 significantly enhances detector count statistics compared to the prior art practice of spacing the detectors from the neutron generator along the length of the sonde. Although for purposes of the present invention, the neutron generator and detector array are preferably located at the same or approximately the same longitudinal position in the sonde, they may be separated longitudinally if desired.

In addition to the detector array 36, a neutron source monitor 38 is located in close proximity to the neutron generator 30, so as to be responsive primarily to high energy neutrons incident directly thereon from the source 30 rather than to lower energy, scattered neutrons or gamma rays. The monitor 38 preferably comprises a proton-recoil type plastic scintillator such as that disclosed in U.S. Pat. No. 4,760,252 to Albats et al., the pertinent portions of which are hereby incorporated by reference.

Figure 2:
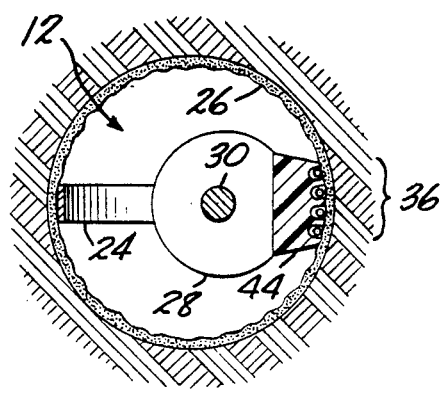
FIG. 2 is a horizontal sectional view of the downhole sonde of FIG. 1, taken along the line 2—2 in FIG. 1 and looking in the direction of the arrows.

The output pulses produced by the detector array 36 and the source monitor 38 are supplied to an electronics section 40 where they are amplified and digitized for application to the telemetry section 42 for transmission over the cable 14 to the surface electronics package 16. As illustrated in FIGS. 1 and 2, the detector array 36 is preferably contained in a pad 44 mounted on the exterior of the sonde 10e diametrically opposite the bow spring 24. The pad 44 is shaped to cut into the mudcake 26 to position the detectors close to the borehole wall so as to reduce the mudcake effect, which can be large for epithermal slowing down time measurements.

In hydrogenous media, the mean neutron slowing down time to a given epithermal energy, e.g. the energy threshold of the detector, is strongly influenced by the time between the last few scatterings that take place at energies above the given epithermal energy. The epithermal neutrons which are detected are predominantly those which had their last few scatterings near the detector. The strong influence of the last few scatterings above the detection energy on the slowing down time, therefore, emphasizes the effect of the medium near the detector on the time-dependent neutron flux. Hence, a neutron decay time measurement affords inherently good spatial resolution, which may be enhanced by a proper selection of the detector size and the provision of multiple detectors in an appropriately arranged array. This affords the capability of deriving porosity in thin beds and also of resolving thin bed sequences, in contrast to conventional neutron logging methods in which count rates are measured at different distances from the neutron source and which produce an average value for the formation porosity between the source and the detector.

In order to take advantage of the good inherent spatial resolution of the slowing down time measurement, the individual neutron detectors should have short active lengths in the vertical direction. Also, detector efficiency should be as high as possible given the detector size, and the time resolution should also be adequate to extract the maximum information from the time decay curves. Within these general criteria, it has been found that spatial resolution is not significantly improved with detector active volume lengths shorter than approximately 2.5 inches (6.5 cm), while shorter active volumes do result in reduced counting rates. A suitable detector configuration is a 0.75 inch (2.0 cm) diameter×2.5 inch (6.5 cm) long 3 He detector at 20 atmospheres. Alternatively, a detector bundle comprised of three 0.25 inch (0.635 cm) diameter×2.5 inch (6.5 cm) long 3 He detectors at 20 atmospheres may be employed. In both cases, the detectors are preferably shielded by 50 mils (approximately 1.25 cm) of cadmium to isolate the detector from thermal neutrons. Although other shielding materials such as gadolinium and samarium and other shielding thicknesses may be employed, a cadmium coating in the range of from 40 mils to 60 mils (approximately 1 to 1.5 mm) is preferred in that it provides a more optimum balance between the suppression of thermal neutrons and the realization of more precise measurements of the epithermal die-away curve over a greater number of decades than do other coating materials. For example, another but less effective cladding would be 2 to 15 mils (approximately 0.05 to 0.375 mm) of gadolinium. Other internal pressures may also be employed but preferably at least as high as 10 Atm. for increased efficiency.

As previously mentioned, the epithermal detector or detectors may be located directly opposite the neutron generator so as to enhance count rate statistics. The source-detector spacing, however, is not critical to the physics of the slowing down time measurement. That is to say, each individual detector will exhibit good inherent spatial resolution even though it is spaced from the neutron source. This provides the opportunity for enhancing count rate statistics and/or the directivity of the slowing down time measurement by the provision of multiple detectors in a detector array.

Figure 3:
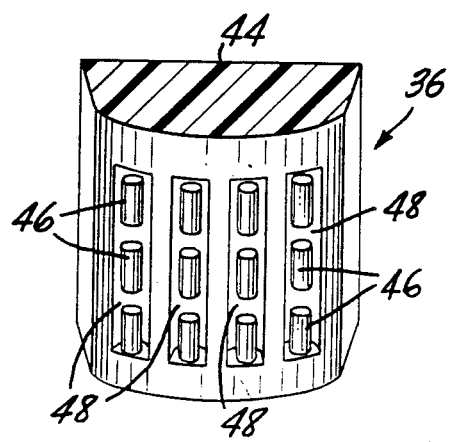
FIG. 3 is a perspective view of one embodiment of a pad-mounted detector array for providing enhanced count rate statistics and/or directivity in epithermal neutron decay time measurements.

In the illustrative embodiment of FIG. 3, for example, the detector array 36 is shown as including twelve individual detectors 46 arranged in three circumferential rows of four detectors each, with the detectors in adjacent rows being aligned axially so as to provide four vertical columns of three detectors each. A different number or arrangement of detectors may of course be used, including if desired only a single detector. Also, rather than utilizing all epithermal detectors, one or more of the detectors in the array might be a thermal neutron detector for purposes of measuring the thermal neutron die-away curve or otherwise indicating the magnitude of the thermal neutron population at any given time following a neutron burst. For example, such a thermal neutron detector could be used to measure the background time curve C(t) in Equation (1) above.

The output signals from the various detectors 46 in the array 36 may be processed in a number of ways to provide enhanced information regarding the earth formation surrounding the sonde or the borehole environment. As described hereinafter in connection with FIG. 10, the output signals from the individual detectors are preferably processed and transmitted to the surface individually. This affords maximum flexibility in the processing and combination of the signals in the surface computer. For example, where high vertical resolution is desired, the count signals from all four detectors in each row of the array could be combined to provide a statistically more precise decay time measurement at the level of each detector row. For the array of FIG. 3, this would provide three separate decay time measurements over the vertical height of the array. On the other hand, if it were desired to provide greater circumferential or horizontal resolution, the count signals from the three detectors in each vertical column of the array could be combined to provide four separate decay time measurements at four different circumferential locations around the borehole wall. Such a combination of measurements might be useful, for example, in following a fracture in the formation or in determining the inclination of a bed. In any event, the provision of a multiple-detector array permits decay time measurements exhibiting greater sensitivity to the geometrical relationship of formation inhomogenuities relative to the sonde axis and to the center of the detector array.

As shown in FIGS. 1–3, the detector array 36 is mounted in an external pad 44 to facilitate placement of the detectors close to the formation 37. Although the pad 44 is preferably external to the housing, this is not essential and the detectors could if desired be mounted inside of the sonde housing in the manner illustrated and described in connection with FIGS. 3 and 4 of the aforementioned Albats et al. U.S. Pat. No. 4,760,252. The pertinent portions of that patent are hereby incorporated by reference. Alternatively, the detector-bearing pad 44 may be carried by an extendable arm articulated to the sonde housing 28, in which case the bow spring 24 might be replaced with a backup arm similarly articulated to the housing 28.

However the detectors are mounted, it is important that they be shielded against borehole neutrons, i.e., those neutrons which have been scattered and slowed down by interactions with the borehole media rather than with the formation. For that purpose, the detectors 46 are preferably shielded on all sides except the formation side with a media having both neutron moderating and neutron absorbing properties. Generally the neutron moderating material should be an hydrogenous material, such as polyethylene or the like, and the neutron absorber should be a 1/v type, such as boron or the like, where v is neutron velocity. For example, a suitable composite shielding media is boron carbide ($B_4C$) distributed in an epoxy binder or other hydrogenous binding medium. In the embodiment of FIGS. 1–3, the body of the pad 44 is itself composed of the shielding material, and the detectors 46 are located in U-shaped channels 48 in the wall of the pad body facing the formation 37. As indicated in FIG. 3, the channels 48 are closed at their axial ends to isolate the detectors 46 from borehole neutrons incident thereon in the axial direction. This complete back-shielding of the detectors substantially reduces the influence of borehole environmental effects on the slowing down time measurement. The side of the pad 44 facing the formation is covered by a thin hard material, e.g. silicon carbide, aluminum or the like, as a mechanical cover to protect the detectors 46 against damage.

The neutron output of the generator 30 should be as high as possible, but should be confined to a burst width that is on the order of and preferably less than the slowing down times of the earth formations expected to be encountered in actual logging conditions. The slowing down times for commercially significant formations vary over the approximate range of from 2 to 15 microseconds for cadmium clad neutron detectors and from approximately 4 to 20 microseconds for gadolinium clad detectors. A suitable burst width would be of the order of 15 microseconds or less. For purposes of the present invention, a preferred burst timing regime for the neutron generator 30 is a burst width of 5 microseconds repeated at a rate of 20 kHz. Other burst timing regimes may of course be used.

Even with the detector pad 44 pressed against the side wall of the borehole 12 and cutting into the mudcake 26, there will frequently be some remaining thickness of mudcake or borehole fluid between the detectors 46 and the formation surface. The resulting standoff of the detector from the borehole wall affects the shape of the epithermal neutron die-away curve and, unless accounted for, leads to erroneous decay time and porosity measurements. As a feature of the present invention, a new parametric form has been developed to fit the epithermal neutron die-away curve to distinguish the formation signal from the standoff (environmental) derived effect and thus permit the derivation from the curve of the exponential slope, or time constant, characteristic of the formation slowing down time.

Figures 4A, 4B:
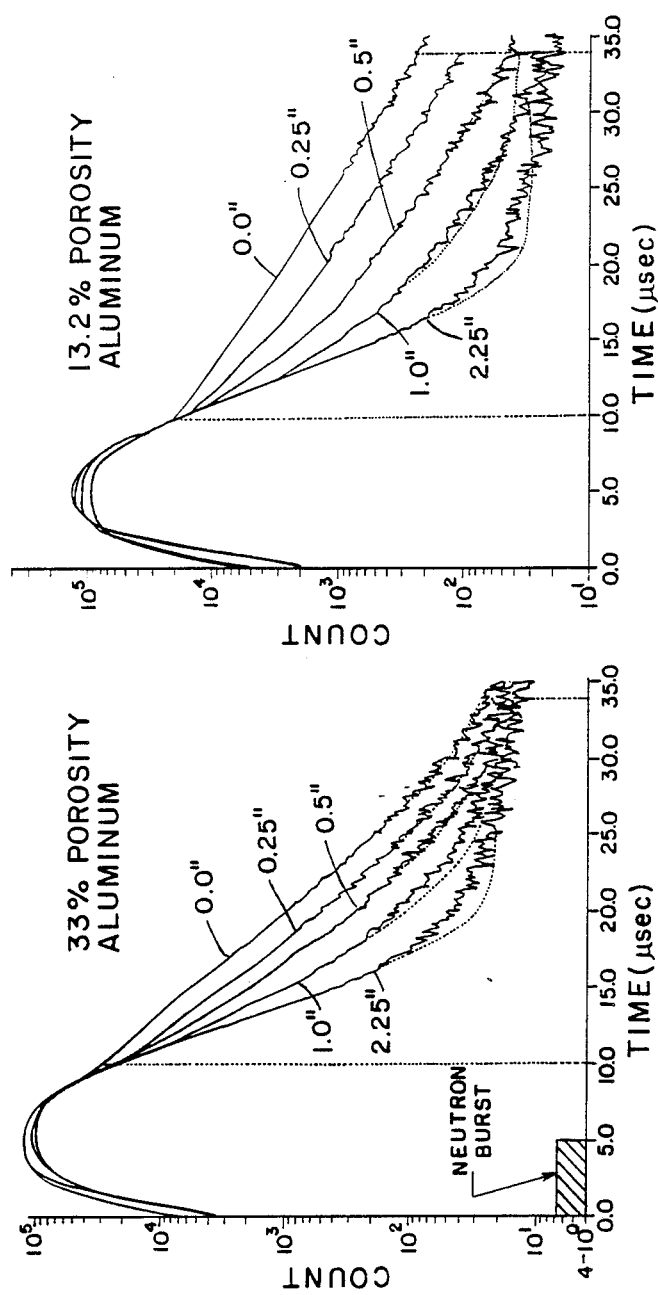
FIGS. 4A and 4B are graphical representations illustrating suites of epithermal neutron counts vs. time curves as a function of water standoff for two different porosities, and also showing in dotted lines corresponding two-parameter (A-B) fits in accordance with the present invention.

FIGS. 4A and 4B illustrate suites of epithermal neutron die-away curves taken in artificial aluminum plate formations of two different porosities (0.125 inch thick aluminum plates stacked at variable spacings and submerged in water). After an initial time delay of approximately 5–10 microseconds after the burst, the die-away curves have an approximately exponential decay whose slope (time constant) varies inversely with the formation hydrogen content or, equivalently, the formation porosity. Although the decay time measurement has a very small response to lithology (approximately ±1%), it does have a significant response to environment and mudcake standoff. The two suites of curves in FIGS. 4A and 4B illustrate the standoff effect for increasing water standoff (0 to 2.25 inches (0 to 5.7 cm) in front of a 33 p.u. and 13.2 p.u., respectively, porosity aluminum formations. The curves were measured using a 20 Atm., 0.75 inch (1.9 cm) diameter×2 inch (5.1 cm) long 3 He detector and pulsing the neutron generator at 20 kHz with a 5 microsecond burst width.

The die-away curves of FIGS. 4A and 4B are very similar until approximately 10 microseconds after the start of the neutron burst, after which the next portion of the curves is the slowing down time region having substantial variation in rate of decay. Finally, at very long times after the burst, the curves are substantially constant with time, representing the detection of neutrons which are in thermal equilibrium with the formation and borehole and whose decay is in the tens of hundreds of microseconds and therefore substantially constant relative to the epithermal slowing down time. With increasing standoff, the slowing down time region of the neutrons exhibits a diminishing time region having a slope consistent with the formation decay time at no (0.0 inch) standoff. At 2.25 inches (5.7 cm) standoff, the die-away curve is quite similar to that for water. Results for 50% porosity mudcake are roughly equivalent if the mudcake thickness is twice that of the water standoff. The parametric fit of the present invention allows both of these effects, i.e., formation decay time and standoff (environmental), to be separated and to be separately evaluated.

The basic goal in fitting die-away curves is to derive from the curve the exponential slope or time constant characteristic of the formation slowing down time. This is a straight forward matter if the dieaway curve is a simple exponential. Where, however, the curve is complex, the bare use of multi-exponential fits often does not give stable answers. In accordance with the present invention, a basically different approach has been employed to parameterize complex die-away curves.

The slowing down time behavior of neutrons in an homogenous and essentially infinite medium is governed by the slowing down time equation:

$$\frac{d}{dt}\phi(t,E) = \Sigma(E',E)*v(E')\phi(t,E') \qquad (2)$$

Where $\Sigma(E',E)$ is the scattering matrix representing the scattering of neutrons from one energy to another by the medium, * represents matrix multiplication, $\phi(t,E)$ is the energy and time dependent neutron population which may be thought of as a vector in the vector space spanned by $\Sigma(E',E)$, and $v(E')$ is the velocity of a neutron of energy $E'$.

Equation (2) is linear and the solution $\phi(E,t)$ can be written as a sum over a distribution $G(b,E)$, or $G(b)$ for short, of inverse time constants $(\tau)$, as follows:

$$\phi(t,E) = \int_0^\infty db\, G(b,E) e^{-bt} \qquad (3)$$

where $b = \frac{1}{\tau}$

Effectively, the die-away curve observed is an integral over a continuous spectrum of time constants. So viewed, the fitting or analysis of a die-away curve derived from a slowing down time measurement is equivalent to determining the spectrum of inverse time constants which defines the die-away curve. In general, the statistical noise and the finite time interval in actual die-away curves prevent this calculation from converging without additional a priori constraints. Nonetheless, the concept that the fundamental goal of time curve fitting is to determine the time constant or exponent distribution is useful. This is especially so when it is considered that, in the case of actual measurements in boreholes, it can reasonably be expected that the time constant spectrum of a die-away curve will be closer to a broad smooth distribution than a spectrum of several well defined time constants because of the usually complicated geometry and heterogeneity of materials found in the borehole environment.

It may be shown from Eq. (3) that a time constant distribution that is bounded below by a time constant $(1/A)$ and that may be represented by a Taylor series plus a delta function $$G(b)=0, b<1/A=N_o(\delta(b-1/A)+B'+C'(b-1/A)+\ldots), b>1/A \qquad (4)$$

gives rise to die-away curves of the form:

$$N(t)=N_o(1+B'/t+C'/2t^2+D'/3t^3\ldots)e^{(-t/A)}, t>0 \qquad (5)$$

where $N(t)$ is the epithermal neutron count at time t, $N_o$ is the epithermal neutron count at an initial time $t_o$, and where B, C, and D derive from the coefficients of the Taylor expansion.

Important advantages of the form of Equation (5) are, (1), that the time constant spectrum has a well defined fundamental inverse time constant given by the delta function with coefficient $N_o$ and, (2), that a series of additional parameters is provided which can be used as necessary to match the increasing complexity of the die-away curve.

In the limiting case of large time (t), which is sufficiently accurate in practical well logging applications, Equation (5) may be expressed in equivalent form as:

$$N(t)=N_o e^{(-t/A+B/t+C/2t^2\ldots)} \qquad (6)$$

Equations (5) and (6) assume that the count data N(t), $N_o$ are corrected for thermal neutron or other background contamination. In practice it is preferred to include background as a fitted term. Also, most curves have been found to be well fit over the time region of interest with only two parameters, i.e., A and B. Accordingly, for most practical applications Equation (6) becomes:

$$N(t) = N_0 e^{(-t/A + B/t \ldots)} + K \qquad (7)$$

Where $N_o$, A and B match the exponential character of the die-away curve and K fits the constant background at long times t. The epithermal neutron dieaway curves generally follow the function of Equation (7) in appropriate standoff region (0.0–0.5 inches 0 to 12.7 mm) an appropriate time decay regions (5–50 microseconds after the burst). For expedience in fitting the measured epithermal die-away curve data in the surface computer, however, the following slightly modified form of Equation (7) is preferred:

$$N(t) = N_0 e^{(-(t-t_0)/A + B/(t-t_0) - B/(t_s-t_0))} + K \qquad (8)$$

where $t_o$ is a preset parameter to define the time origin of the fit relative to the neutron burst and $t_s$ is the start time of the fitting (fiducial) window. In this form, $N(t)$ equals $N_o$ when t equals $t_s$. The results obtained from Equation (8) differ slightly from those obtained with Equation (7), but are equivalent for practical purposes.

Figure 5A:
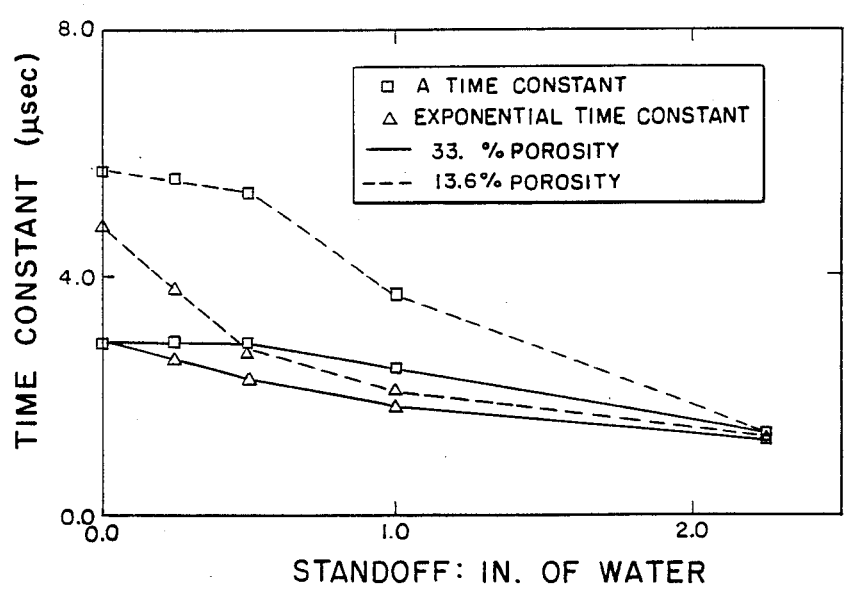
FIGS. 5A and 5B are graphical representations of the epithermal neutron decay time constant A and the B parameter, respectively, of the multi-parameter fitting technique of the invention vs. water standoff for two different porosities, with FIG. 5A also illustrating plots of the single-exponential time constant vs. standoff for the same two porosities.
Figure 5B:
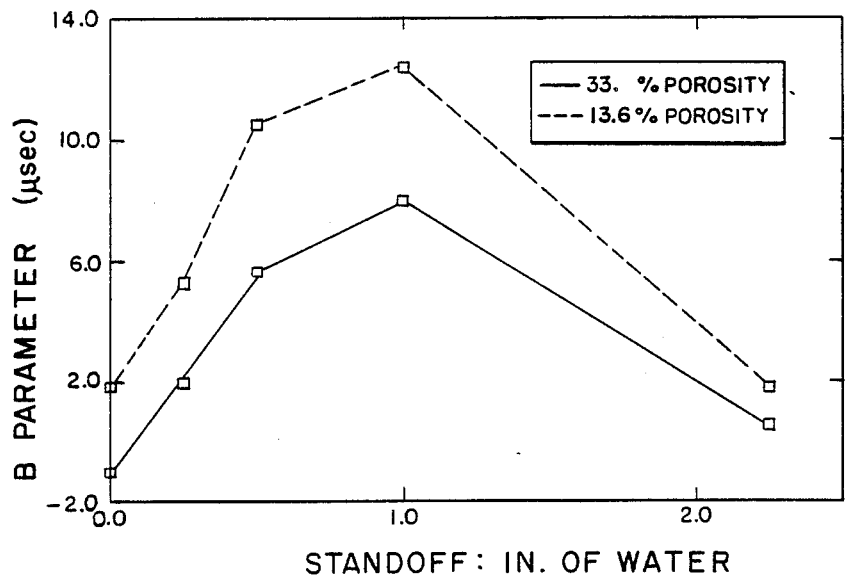

The dotted line curves in FIGS. 4A and 4B represent the fits to the respective measured die-away curves of the parametric form of Equation (8) including only the two parameters A and B. A significant feature of this two-parameter form is that, in addition to be being able to fit the suites of curves in FIGS. 4A and 4B, the parameters A and B separate the standoff and mudcake dependence of the curves from the formation dependence. This is illustrated in FIGS. 5A and 5B, which plot the decay time constant A vs. standoff and the B parameter vs. standoff, respectively, for 33% and 13.6% porosity simulated formations. For comparison purposes FIG. 5A also plots the decay time constant values obtained with a single exponential fit to the die-away curves obtained in the two different porosity formations.

As can be seen from FIG. 5A, little variation occurs in the value of the time A until a standoff of more than 0.5 inches (12.7 mm) of water is reached, after which the time constant A decreases gradually and linearly with increasing standoff. FIG. 5B, on the other hand, shows that the B parameter is linearly dependent on the amount of standoff and varies substantially in magnitude with standoff. The ability of the two-parameter (A-B) fitting form to separate the formation slowing down time effect from that of the standoff and mudcake effect is clearly demonstrated.

Generally when extra parameters are added to a curve fitting procedure, precision but not accuracy is sometimes lost. In the case of FIG. 5A, the precision of the decay time constant A is 1.5 to 2 times poorer than the time constant obtained with a simple exponential fit to the data. As is clear from FIG. 5A, however, the gain in accuracy with the A-B fitting form is large relative to the simple exponential fit, especially at the lower porosity. For practical purposes, moreover, if the standoff is known the loss of precision is recoverable.

The measurements plotted in FIG. 5A clearly show that the two-parameter fitting form of the invention allows the formation decay time to be adequately sensed through at least 0.5 inch (12.7 mm) of water standoff. Water standoff affects the measurements because of the large quantity of hydrogen interpose between the detector and the formation. A 1.5 inch (3.8 cm) thick standoff region of 33% porosity would be expected to have the same effect as 0.5 inch standoff of water. At zero standoff, therefore, the depth of investigation of the multi-parameter fitting technique of the present invention would be expected to be on the order of 1.5 inches (3.8 cm).

A further important feature of the two-parameter fit is that the departure of the B parameter term from zero indicates the degree of departure of the epithermal die-away curve from a simple exponential decay. For example, even though the die-away curve is well fit by the two-parameter form, the departure of the B parameter from zero in the case of nonporous or low porosity formations is indicative of the nonexponential decay of the epithermal neutron population in such formations.

As may be seen from the data of FIG. 5B, the B parameter term is dependent not only on the amount of standoff but also on the formation porosity. With uniform porosity formations, on the other hand, the B parameter term has a small response to porosity directly. When the formation decay time (and thus, porosity) changes rapidly with depth, such as occurs at bed boundaries for example, the epithermal die-away curves will not have a simple exponential form even at zero standoff. This will manifest itself in a larger B parameter term, and large values of the B parameter term have been found to be correlated with high porosity contrast at bed boundaries. Indeed, the B parameter term peaks when the logging tool crosses the boundary between two beds of different porosities. Although the decay time term A of the two-parameter fit also changes as the tool crosses a bed boundary, the B parameter term enables sharper definition of bed boundaries to be achieved.

Figure 6:
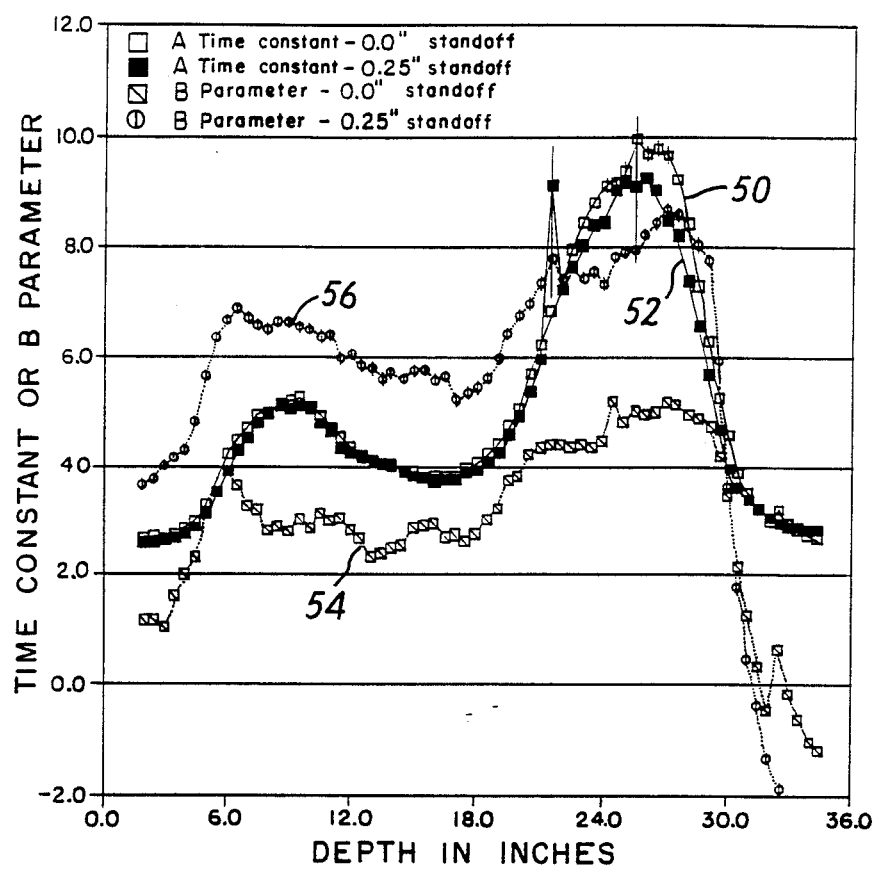
FIG. 6 is a graphical comparison of the epithermal decay time constant A and the B parameter values for two different standoffs, showing the separation of formation and standoff effects achieved by two-parameter fits in accordance with the invention.

The separation of standoff and formation effects achieved by the multi-parameter fit of the invention is further demonstrated by the data of FIG. 6. In FIG. 6, the curve 50 (open squares) represents the plot of the decay time parameter A vs. depth along a simulated thin bed formation with zero standoff. The formation consisted of a series of uniform slabs of porous materials through which an eight inch (approximately 20 cm) borehole passed. The individual slabs' porosity varied between 0.0 and 35.0 porosity units. The slabs' thickness varied from one to eight inches. Insofar as was possible with a finite number of slabs, the sequential order of slabs was random. The porous materials were either limestone or stacks of 0.125 inch (3.2 mm) aluminum plates at variable spacings. The data were taken using a 0.75 inch (1.9 cm) diameter×2 inch (5.1 cm) long 20 Atm 3 He detector coated with 50 mils (approximately 1.25 mm) of cadmium. Curve 52 (solid squares) in FIG. 6 represents a plot of the decay time constant A as derived from the same formation and with the same detector but for the condition of 0.25 inch (6.35 mm) water standoff. As may be seen, the decay time (A parameter) curves are quite similar over the full depth of the simulated formation. The other two curves in FIG. 6, i.e., curve 54 (stroked squares) and curve 56 (stroked circles) represent the B parameter terms for zero standoff and 0.25 inch (6.35 mm) standoff, respectively. In contrast to the curves 50 and 52 for the A parameter term, the B parameter curves 54 and 56 differ from one another by approximately 2 units across the full depth of the formation. Hence, it is clear that the two-parameter fitting form of the invention has effectively separated the formation (slowing down time) and standoff influences on the epithermal neutron die-away curve measurements and has provided a decay time measurement (A parameter) which is substantially free of standoff (environmental) effects.

Figure 7:
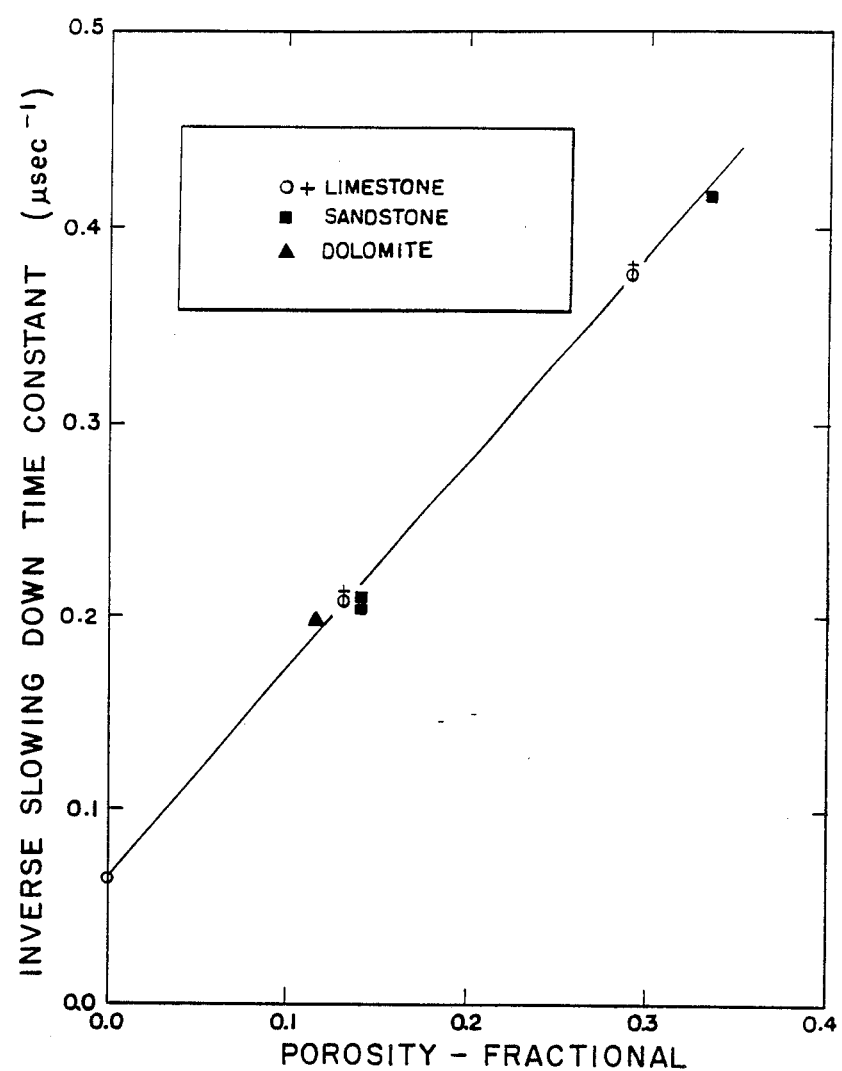
FIG. 7 is a graphical representation of the inverse epithermal decay time constant (as determined by use of the multi-parameter fitting technique of the present invention) vs. porosity for two different test formations.

FIG. 7 is a plot of the inverse decay time parameter (1/A) vs. fractional porosity, showing that the inverse parameter 1/A varies linearly with porosity and also showing that the decay time parameter A is only slightly affected by differences in formation lithology. Although for convenience the inverse decay time constant (1/A) has been plotted against porosity in FIG. 7, it will be understood that the reciprocal could be plotted against porosity if desired. In either case, the decay time parameter A, as determined by the multi-parameter fit of the present invention, is directly correlatable with and representative of the formation porosity.

Figure 8:
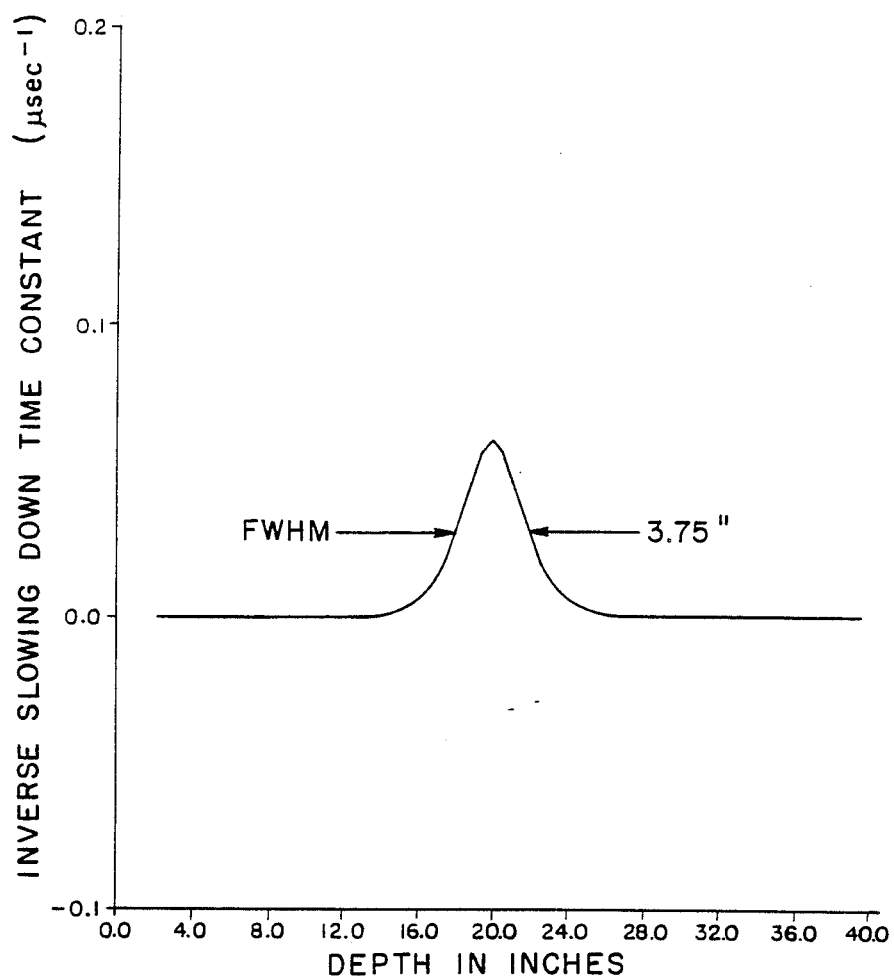
FIG. 8 is a graphical representation depicting the vertical resolution of the inverse time constant (1/A) in a simulated thin bed formation.

The vertical resolution of the decay time measurement is illustrated in FIG. 8, which shows the response of the inverse time constant (1/A) to change in porosity as the detector passes a very thin simulated bed. A single 0.75 inch by 2.0 inch (1.9 cm by 5.1 cm) 3 He detector, pressurized to 20 Atm and clad with 50 mils (approximately 1.25 mm) of cadmium, was employed. The inverse time constant response is seen to be approximately Gaussian, with a full-width-half-maximum (FWHM) of 3.75 inches (9.5 cm). This is better intrinsic vertical resolution than the prior art count rate ratio tools by a factor of 3 to 4. Because the neutron slowing down process is roughly isotropic, the vertical sensitivity function of FIG. 8 should also be representative of the depth of investigation. This indicates a depth of investigation of approximately one-half the FWHM, or approximately 1.87 inches (4.75 cm) which is consistent with the depth of investigation inferred from the standoff measurements reflected in FIG. 5A.

Figure 9:
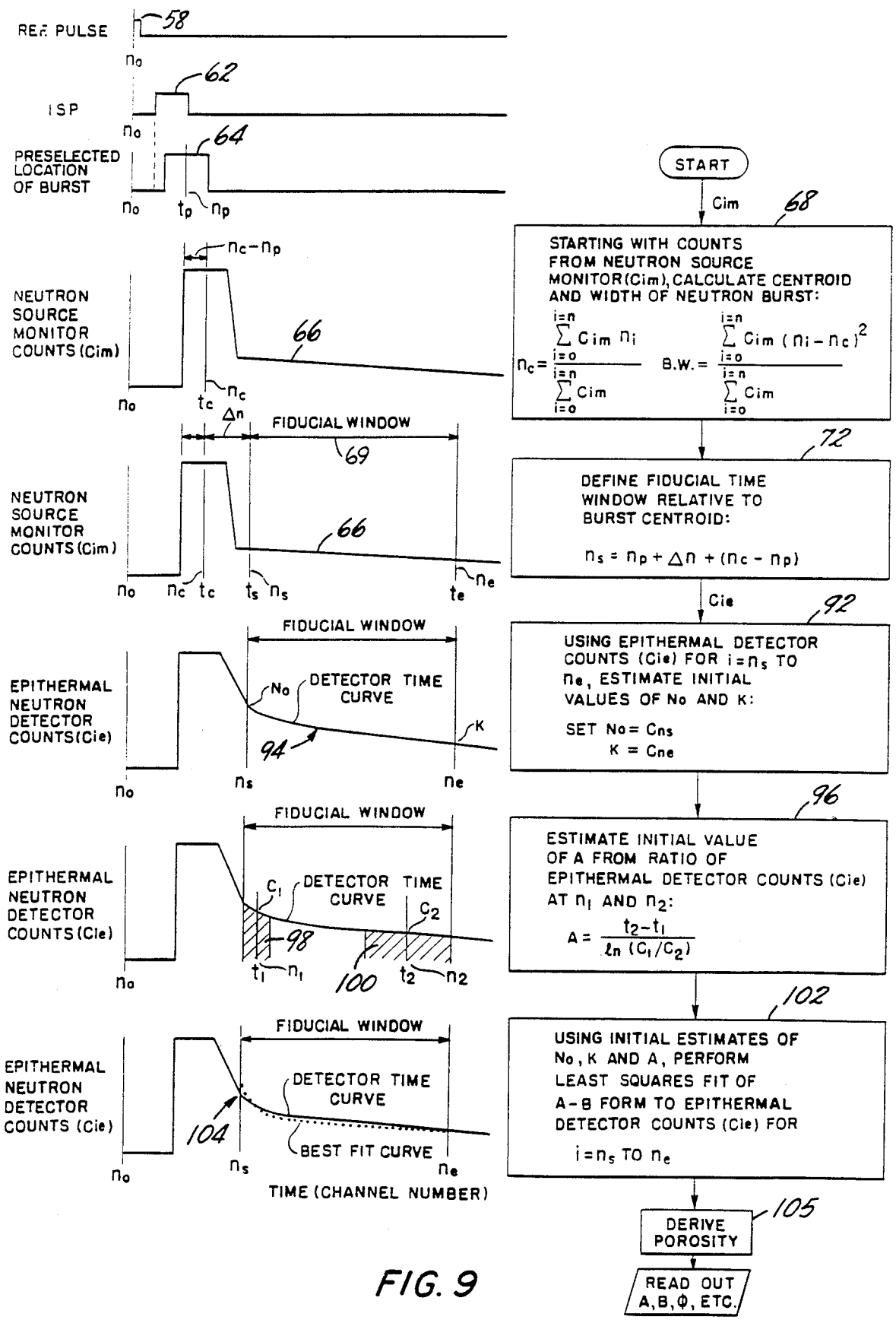
FIG. 9 is a diagrammatic and descriptive flow chart illustrating one embodiment of a data processing procedure for determining the epithermal neutron decay time constant A and standoff parameter B in a surface computer in accordance with the multi-parameter fitting technique of the invention.
Figure 10:
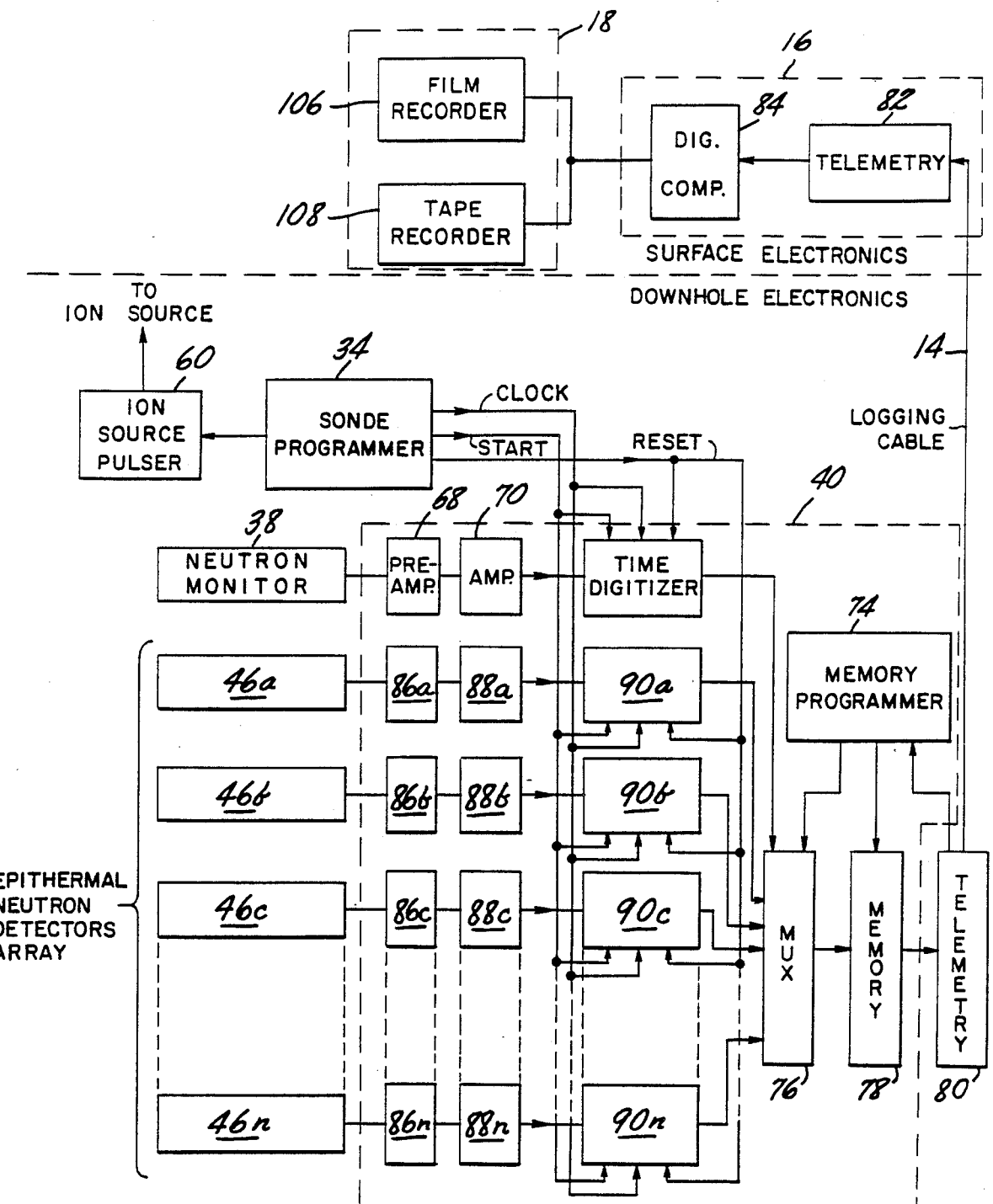
FIG. 10 is a schematic block diagram of one embodiment of the electronic systems of a epithermal neutron logging apparatus constructed in accordance with the invention.

FIG. 9 depicts a flow chart of a preferred processing procedure for analyzing an epithermal neutron die-away curve in accordance with the multi-parameter fitting form of the present invention. The processing steps are set out in graphical form on the left-hand side of FIG. 9 and in word and mathematical form on the right-hand side. FIG. 10 illustrates the components of the downhole and surface electronics for carrying out the respective data generation, data collecting, and data processing steps.

Each burst-measurement cycle is initiated by the sonde programmer 34 transmitting a reference time pulse 58 to the ion source pulser 60, which in turn generates an ion source pulse (ISP) 62 for application to the ion source (not shown) in the neutron generator 30 (see FIG. 1). The ion source pulse (ISP) causes the neutron generator 30 to emit a burst of neutrons 64 of approximately rectangular cross section. As shown in FIG. 9, the leading edge of the neutron burst trails the leading edge of ion source pulse by a small increment of time, the magnitude of which depends upon the characteristics of the individual neutron generator tube. The abscissa in FIG. 9 is a time axis, with positions therealong being interchangeably designated as particular times t or as particular channel numbers n in a multichannel time analyzer. If desired, the magnitude of the time lag between the initiation of the ion source pulse and the initiation of the neutron burst could be extended to provide for a background measurement time interval following the end of the preceding epithermal neutron measurement interval.

In the absence of perturbing effects such as environmental temperature changes or the like, the neutron burst 64 from a given neutron generator should occur at a predetermined location along with time axis. Any convenient reference point across the burst profile, such as the leading edge or the trailing edge of the burst, may be used to define the predetermined reference time. In the embodiment of FIG. 9, the burst centroid has been used to define the predetermined location of the burst at time $t_p$ and channel number $n_p$. The predetermined time parameters of the neutron burst 64 are stored in the surface computer for use in subsequent processing.

For correct analysis of the measured epithermal neutron die-away curve using the multi-parameter fit of the invention, it is important that the time interval over which the data are measured be maintained in a known relationship to the time of occurrence of the neutron burst. Otherwise, the count rate data might be perturbed by change in the time of measurement relative to the burst, rather than reflecting the true neutron slowing down properties of the formation. The precise time of occurrence and duration of the neutron burst frequently vary during the data accumulation time, however, due to environmental temperature effects in the borehole or because of fluctuation in the operating conditions within the neutron generator tube. Such variations of the neutron burst parameters, although typically small, can nonetheless unduly perturb the accuracy of the epithermal neutron die-away measurements, which are also made over a very short time interval, typically 50 microseconds or less.

As a first step, therefore, the actual time of occurrence of the neutron burst should be determined and compared to the predetermined time location of the burst to permit compensation for any departure of the actual burst location from the predetermined burst location. In the preferred embodiment of FIG. 9, the counts versus time curve 66 from the neutron source monitor 38 is employed for this purpose. Starting with the counts $C_{im}$ from the neutron source monitor, the centroid location and the width of the neutron burst are calculated as indicated at box 68 in FIG. 9. For that purpose, the output signals from the neutron monitor 38 are applied to a pre-amp 68, amplifier 70 and time digitizer 72 in the electronics section 40 for the production of a burst histogram (neutron source output versus time curve) 66. The time digitizer 72 is armed by a START pulse from the sonde programmer 34, which is synchronized with the ion source pulse (ISP) and occurs slightly before the neutron burst. CLOCK pulses from the sonde programmer 34 determine the width of the time channels and the input pulses from the amplifier 70 stop the CLOCK pulse counters in the digitizer 72 to digitize the time intervals from the START pulse to the input pulses. At the end of the data measurement interval, e.g., 40–50 microseconds after the burst, the digitizer 72 is reset to zero and readout by a RESET pulse from the sonde programmer 34.

Under control of a memory programmer 74 in the electronics section 40, the output signals (counts per channel) from the time digitizer 72 are multiplexed at 76 with the other detector signals as described hereinafter, and are applied to a digital read-write memory 78 in the downhole electronics section 40. Each time channel is assigned a memory address, and the addresses from an individual signal channel are contiguous. Histogramming of the data from a signal channel is achieved by incrementing the number stored at a given address by one every time a new signal occurs in the corresponding time channel. Counts per channel data from the neutron monitor 38 are accumulated in the downhole memory 78 for a predetermined time interval, e.g. one second, and are then destructively read out of memory by the memory programmer 74, applied to the downhole telemetry section 80, and transmitted serially over the logging cable 14 to the uphole telemetry section 82 in the surface electronics package 16. The counts per channel data from the uphole telemetry section 82 are accumulated in buffer storage (not shown) included as part of a general purpose digital computer 84 in the surface electronics 16, so as to acquire the neutron burst histogram 66 over a desired accumulation time interval, which may be selected, for example, to correspond to a specific interval of depth according to the logging speed of the downhole sonde 10.

Suitable circuitry for the downhole electronics section 40 is disclosed in more detail in the aforementioned Nelligan U.S. Pat. No. 4,012,712, except that the pulse height analyzer described in that patent would be replaced by a time digitizer. The telemetry sections 80, 82 may be constructed as described in the Nelligan '712 patent or as described in Belaigues et al. U.S. Pat. No. 4,355,310. The pertinent portions of the '712 and '310 patents are hereby incorporated by reference.

Starting with the accumulated counts per channel data $C_{im}$ where i designates the channel number and m designates the source monitor, the computer 84 calculates the channel location $n_c$ of the burst centroid by summing the products of $C_{im} \times n_i$ from i=0 to i=N, where N is arbitrarily selected channel number above any channel location where the burst is likely to occur, and then dividing the sum of the products by the total counts over channels i=0 to i=N. This computation is indicated at the left-hand side of box 68 in FIG. 9. The burst width is also preferably computed by calculating the second moment about the burst centroid. This is done by carrying out the computation indicated to the right-hand side of box 68. The calculated burst width may then be compared with the width of the ion source pulse 64 to determine whether the actual burst width is satisfactory. If it is not, this condition is flagged so that appropriate action may be taken.

In the illustrative example of FIG. 9, computation of the burst centroid in box 68 for the burst histogram 66 has shown that the centroid location $n_c$ differs from the predetermined centroid location $n_p$ by the amount $n_c - n_p$. In practice, the difference $n_c - n_p$ may be either positive or negative. In either case, the departure of the burst location from the predetermined location for the burst should be taken into account for accurate processing of the measured epithermal neutron die-away curve data. This is done by, in effect, shifting the counts per channel distributions from the epithermal neutron detectors by the increment $n_c - n_p$ and making the analysis assuming that the burst centroid is at the predetermined location $n_p$. In practice, such compensation preferably is made by defining a fiducial window 69 along the time axis. The window 69 begins at a time $t_s$, $n_s$ and ends at a time $t_e$, $n_e$. The starting time $t_s$, $n_s$ is preferably selected at a fixed time or number of channels $\Delta n$ after the time location $t_c$, $n_c$ of the burst centroid. (See FIG. 9) Hence the nominal starting channel location $n_s$ of the fiducial window 69 would be $n_p + \Delta n$. Where, as in the example of FIG. 9, the actual burst centroid location $n_c$ departs from the predetermined centroid location $n_p$, the increment $n_c - n_p$ must also be added (positively of negatively) to the value of $n_p$ to obtain the correct starting location $n_s$ of the fiducial window 69. This computation is illustrated at box 71 in FIG. 9.

The duration of the fiducial time window 69 may be selected as desired and preferably is of sufficient length to span the decay of the epithermal neutron population from a time following the neutron burst at which the early borehole effects have substantially disappeared to a time at which the decay has substantially reached the level of thermal neutron background. In typical logging conditions, for example, the fiducial window 69 might extend from approximately 5-10 microseconds to approximately 40-50 microseconds after the burst centroid, assuming a 5 microsecond wide neutron burst.

The fiducial window 69 thus defined is then used to analyze the epithermal neutron die-way curve as measured by the epithermal neutron detectors 46 and acquired over the data accumulation interval for which the burst centroid location $n_c$ has just been computed. As illustrated in FIG. 10, the individual neutron detectors 46a, 46b, 46c . . . 46n are preferably individually coupled to separate pre-amps 86a, 86b, 86c . . . 86n, amplifiers 88a, 88b, 88c . . . 88n, and time digitizers 90a, 90b, 90c . . . 90n to define separate signal channels. As with the data from the neutron source monitor 38, the counts per channel outputs from these epithermal neutron signal channels are applied to the multiplexer 76 for multiplexing to the read-write memory 78 under the control of the memory programmer 74. Alternatively, groups of the neutron detectors, for example, detectors 46a, 46b and 46c, could be jointly coupled to a single pre-amp and time digitizer circuit to provide a summed decay curve measurement. As previously mentioned, the grouped detectors could include the four detectors in each horizontal row in FIG. 3 or the three detectors in each vertical column in FIG. 3. Preferably, however, the output signals from the individual epithermal neutron detectors are counted and processed separately in the downhole electronics and are separately transmitted to the surface, with any desired combination of the separate detector counts/channel data then being made in the data processing carried out in the computer 84. This affords maximum flexibility in combining and analyzing the measured epithermal neutron die-away data.

The sonde programmer 34 controls the operation of the time digitizers 90a, 90b, 90c . . . 90n by the generation of START, CLOCK and RESET pulses in the same manner previously described in connection with the source monitor 38. The width and number of channels provided is optional, but should be sufficient to give good definition to the die-away curves over the entire measurement interval between bursts.

As with the counts per channel signals from the source monitor 38, the counts per channel signals from the time digitizers 90a, 90b, 90c . . . 90n are accumulated in the downhole memory 78 until read out by the memory programmer 74 for telemetering to the surface. These data are also accumulated in the buffer storage of the surface computer 84 for the desired accumulation interval and are then transferred to the computer for processing in accordance with the multi-parameter fitting function of the present invention. The preferred form of the multi-parameter relationship implemented in the computer program is that of Equation (8).

Using the accumulated epithermal neutron counts per channel data $C_{ie}$ for channel numbers i=$n_s$ to $n_e$, the initial values of $N_o$ and K are estimated by setting $N_o$ equal to $Cn_s$ and K equal to $Cn_e$. This is indicated in box 92 and the adjacent time graph 94 in FIG. 9. The initial value of the decay time parameter A is then estimated in box 96, based on the assumption of a simple exponential decay, from the ratio of the epithermal neutron counts $C_1$ and $C_2$ in two time bins 98 and 100 whose centroids are located at t1, n1 and t2, n2, respectively. The widths of the bins 98 and 100 may be selected as desired to provide satisfactory total counts in the two bins. Then using the initial estimates of $N_o$, K and A as obtained in boxes 92 and 96, a least-squares fit of Equation (8) is made to the epithermal detector counts $C_{ie}$ for i=$n_s$ to i=$n_e$. For the initial iteration, the value of the B parameter may be taken as zero. This step is illustrated at box 102 in FIG. 9. The best fit curve is illustrated by a dotted line in the adjacent time graph 104. (The displacement of the dotted line from the solid line is exaggerated in the time graph 104 for purposes of illustration) Any suitable commercial least-squares solver may be used in making this fit. A suitable solver, for example, is the ZXSSQ subroutine available from the International Mathematical Subroutine Library. The best-fit criteria may be selected as desired, e.g. chi-squared, minimum RMS, specified number of iterations, etc.

Upon attainment of the best fit of Equation (8) to the measured epithermal count rate data within the fiducial window 69 the final value of the decay time parameter A is converted at box 105 to a porosity value $\phi$ in accordance with the relationship of FIG. 7 or other calibration curve. The values of A, B, $\phi$ and, if desired $N_o$ and K are then read out of the computer 84 to the recorder-plotter 18 for recording in a conventional manner as a function of depth on a film recorder 106 and a magnetic tape recorder 108. In addition to the fitted parameters, the counts per channel data from the neutron monitor 38 and the epithermal neutron detectors 46a-a ... 46n are also preferably recorded on magnetic tape.

Although the embodiment of FIGS. 9 and 10 has been described in the context of an on-line, or real time, fitting procedure at the well site, it will be understood that the processing could be carried out at a remote site if desired. In that case, the on-site surface electronics 16 need record only the count rate data from the downhole detectors, and the processing of that data in accordance with the procedure of FIG. 9 could be carried out remotely based on the magnetically recorded data.

Although the invention has been described and illustrated herein by reference to specific embodiments thereof, it will be understood that various modifications and variations may be made to such embodiments without departing from the inventive concepts disclosed. Accordingly, all such variations and modifications are intended to be included within the spirit and scope of the appended claims.

We claim:

1. Apparatus for epithermal decay time logging of an earth formation traversed by a well borehole, comprising:

a sonde, having an elongate housing, adapted to be lowered into and moved through the borehole;

neutron source means carried by the sonde for repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;

at least one detector carried by the sonde for detecting epithermal neutrons and generating signals representative thereof;

means for positioning said at least one detector closely adjacent the wall of the borehole to minimize the standoff of the detector from the borehole wall;

means for shielding said at least one detector against neutrons incident thereon from all directions except the formation to enhance the sensitivity of the detector to neutrons incident thereon from the formation;

means coupled to said at least one detector for measuring the population of detected epithermal neutrons during each of a plurality of time periods subsequent to said neutron bursts and generating a plurality of count signals representative of said respective populations; and signal processing means for processing said plurality of count signals in accordance with a predetermined relationship, including one time-constant parameter representative of the epithermal neutron decay time of the formation and at least one additional parameter representative of the effect of detector standoff from the borehole wall, to derive a signal representative of a standoff-compensated value of the epithermal decay time of the formation.

2. The apparatus of claim 1 wherein said signal processing means further comprises means for deriving from said plurality of count signals at least one additional signal representative of the effect of detector standoff from the borehole wall on the detected epithermal neutron populations.

3. The apparatus of claims 1 or 2 further comprising means coupled to said signal processing means for recording said decay time signal or said at least one additional signal, respectively, as a function of depth within the borehole.

4. The apparatus of claim 2 wherein said signal processing means comprises means for processing said plurality of count signals generally in accordance with the relationship $$N(t) = N_o e^{(-t/A + B/t \ldots)} + K$$

to derive said first signal and said at least one additional signal, where:

N(t) is the epithermal neutron count at time t, $N_o$ is the epithermal neutron count at an initial time $t_o$, e is the Napierian log base, A is the epithermal neutron decay time constant of the earth formation, B is a parameter indicative of the effect of detector standoff from the borehole wall, and K is a function of background.

5. The apparatus of claim 1, wherein the locus of emission of neutrons by said neutron source means and the active volume of said at least one epithermal neutron detector are located at substantially the same elevation along the logging sonde.

6. The apparatus of claim 1 wherein said at least one epithermal neutron detector comprises an active volume filled with helium-3 gas and clad with a thermal neutron absorbing material.

7. The apparatus of claim 1 or 6 wherein said shielding means comprises a 1/v-type neutron-absorbing material and an hydrogenous neutron-moderating material.

8. The apparatus of claim 6 wherein said thermal neutron absorbing material comprises a cadmium layer of from substantially 40 mils (1 mm) to substantially 60 mils (1.5 mm) thick.

9. The apparatus of claim 6 wherein the sensitive volume of said at least one detector is on the order of 6.5 centimeters (2.5 inches) or less long in the lengthwise direction of the sonde.

10. The apparatus of claim 1 or claim 9 further comprising a plurality of epithermal neutron detectors carried by the sonde, all of said detectors being shielded against borehole neutrons by said shielding means.

11. The apparatus of claim 10 wherein at least two of said detectors are spaced apart lengthwise of said sonde to provide an extended vertical area of formation over which epithermal neutrons are detected.

12. The apparatus of claim 10 wherein at least two of said detectors are spaced apart circumferentially of said sonde to provide an extended horizontal area of formation over which epithermal neutrons are detected.

13. The apparatus of claim 1 wherein said detector positioning means comprises:
a pad carried by said sonde externally of said housing, said at least one detector being mounted on said pad adjacent the outer surface thereof; and
means for urging said outer surface of said pad into engagement with the borehole wall.

14. The apparatus of claim 13 wherein said means for urging said pad into engagement with the borehole wall comprises decentralizing means mounted on the side of said sonde opposite to said pad for engagement with the opposite side wall of the borehole.

15. The apparatus of claim 13 wherein:
said pad is comprised of said shielding means; and
said at least one detector is mounted within a recess in the outer surface of said pad.

16. The apparatus of claim 1 further comprising:
means for monitoring the output of the neutron source during one or more bursts and for generating signals representative thereof; and
means for processing said neutron source output signals to define a fiducial time window relative to the neutron burst for said processing of said plurality of epithermal neutron count rate signals, so as to compensate for the effect of any variation in the time location of the neutron burst.

17. The apparatus of claim 16 wherein said neutron source monitoring means comprises an organic scintillator for detecting high-energy neutrons, said scintillator being located closely adjacent to said neutron source so as to reduce the incidence thereon of scattered-back neutrons relative to the incidence thereon of high-energy neutrons emanating directly from the neutron source.

18. The apparatus of claim 16 further comprising means for processing said neutron source output signals to determine the neutron burst width.

19. The apparatus of claim 16 wherein said fiducial-window signal processing means comprises means for determining the time position of the neutron burst relative to a reference time and for adjusting the time of occurrence of said fiducial time window to compensate for any departure of the time position of the neutron burst from a predetermined relationship to said reference time.

20. The apparatus of claim 19 wherein:
the time position of the neutron burst is determined by processing said neutron source output signals to derive the centroid of the neutron burst; and
the time of occurrence of said fiducial time window is adjusted to compensate for the departure of the derived burst centroid from a predetermined reference time for the burst centroid.

21. A method for epithermal decay time logging of an earth formation traversed by a well borehole, comprising:
repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;
positioning at least one epithermal neutron detector closely adjacent the wall of the borehole to minimize the standoff of the detector from the borehole wall;
shielding said at least one detector against neutrons incident thereon from all directions except the formation to enhance the sensitivity of the detector to neutrons incident thereon from the formation;
measuring the population of detected epithermal neutrons during each of a plurality of time periods subsequent to said neutron bursts and generating a plurality of count signals representative of said respective populations; and
processing said plurality of count signals in accordance with a predetermined relationship, including one time-constant parameter representative of the epithermal neutron decay time of the formation and at least one additional parameter representative of the effect of detector standoff from the borehole wall, to derive a signal representative of a standoff-compensated value of the epithermal decay time of the formation.

22. The method of claim 21 further comprising deriving from said plurality of count signals at least one additional signal representative of the effect of detector standoff from the borehole wall on the detected epithermal neutron populations.

23. The method of claims 21 or 22 further comprising recording said decay time signal or said at least one additional signal, respectively, as a function of depth within the borehole.

24. The method of claim 22 wherein said decay time signal and said at least one additional signal are derived by processing said plurality of count signals generally in accordance with the relationship $$N(t) = N_o e^{(-t/A + B/t \ldots)} + K$$

where:
N(t) is the epithermal neutron count at time t,
$N_o$ is the epithermal neutron count at an initial time $t_o$,
e is the Napierian log base,
A is the epithermal neutron decay time constant of the earth formation,
B is a parameter indicative of the effect of detector standoff from the borehole wall, and
K is a function of background.

25. The method of claim 21, wherein the locus of emission of neutrons and the locus of detection of epithermal neutrons are at substantially the same depth in the borehole.

26. The method of claim 21 wherein said at least one epithermal neutron detector comprises an active volume filled with helium-3 gas and clad with a thermal neutron absorbing material.

27. The method of claim 21 or 26 wherein said shielding step comprises shielding said at least one detector on all sides except that facing the formation with a 1/v-type neutron-absorbing material and an hydrogenous neutron-moderating material.

28. The method of claim 26 wherein said thermal neutron absorbing material comprises a cadmium layer of from substantially 40 mils to substantially 60 mils thick.

29. The method of claim 21 further comprising positioning a plurality of epithermal neutron detectors closely adjacent the borehole wall, and shielding all of said detectors against borehole neutrons.

30. The method of claim 29 further comprising positioning at least two of said detectors in spaced apart relation lengthwise of said sonde to provide an extended vertical area of formation over which epithermal neutrons are detected.

31. The method of claim 29 further comprising positioning at least two of said detectors in spaced apart relation circumferentially of said sonde to provide an extended horizontal area of formation over which epithermal neutrons are detected.

32. The method of claim 21 further comprising:
monitoring the output of the neutron source during one or more bursts and generating signals representative thereof;
processing said neutron source output signals to define a fiducial time window relative to the neutron burst for said processing of said plurality of epithermal neutron count signals, so as to compensate for the effect of any variation in the time location of the neutron burst.

33. The method of claim 32 wherein said neutron source monitoring step comprises detecting high-energy neutrons with an organic scintillator located closely adjacent to said neutron source so as to reduce the incidence thereon of scattered-back neutrons relative to the incidence thereon of high-energy neutrons emanating directly from the neutron source.

34. The method of claim 33 further comprising processing said neutron source output signals to determine the width of the neutron burst.

35. The method of claim 32 wherein said fiducial-window signal processing means comprises determining the time position of the neutron burst relative to a reference time and adjusting the time of occurrence of said fiducial time window to compensate for any departure of the time position of the neutron burst from a predetermined relationship to said reference time.

36. The method of claim 35 wherein:
the time position of the neutron burst is determined by processing said neutron source output signals to derive the centroid of the neutron burst; and
the time of occurrence of said fiducial time window is adjusted to compensate for the departure of the derived burst centroid from a predetermined reference time for the burst centroid.

37. Apparatus for determining the porosity of an earth formation traversed by a well borehole, comprising:
a sonde adapted to be lowered into and moved through the borehole;
neutron source means carried by the sonde for repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;
at least one detector carried by the sonde for detecting epithermal neutrons and generating signals representative thereof;
means for positioning said at least one detector closely adjacent the wall of the borehole to minimize the standoff of the detector from the borehole wall;
means for shielding said at least one detector against neutrons incident thereon from all directions except the formation to enhance the sensitivity of the detector to neutrons incident thereon from the formation;
means coupled to said at least one detector for measuring the population of detected epithermal neutrons during each of a plurality of time periods subsequent to said neutron bursts and generating a plurality of count signals representative of said respective populations; and
signal processing means for processing said plurality of count signals in accordance with a predetermined relationship, including one time-constant parameter representative of the epithermal neutron decay time and at least one additional parameter representative of the effect of detector standoff from the borehole wall, to obtain a signal correlatable with the porosity of the surrounding earth formation.

38. The apparatus of claim 37 further comprising means coupled to said signal processing means for recording said porosity-correlatable signal as a function of depth within the borehole.

39. The apparatus of claim 37 wherein said predetermined relationship is generally of the form $$N(t) = N_0 e^{(-t/A + B/t \ldots)} + K$$

where:
N(t) is the epithermal neutron count at time t,
$N_0$ is the epithermal neutron count at an initial time $t_o$,
e is the Napierian log base (2.7183),
A is the epithermal neutron decay time constant of the earth formation,
B is a parameter indicative of the effect of detector standoff from the borehole wall, and
K is a function of background.

40. The apparatus of claim 37, wherein the locus of emission of neutrons by said neutron source means and the active volume of said at least one epithermal neutron detector are located at substantially the same elevation along the logging sonde.

41. The apparatus of claim 37 wherein said at least one epithermal neutron detector comprises an active volume filled with helium-3 gas and clad with a thermal neutron absorbing material.

42. The apparatus of claims 37 or 41 wherein said shielding means comprises a 1/v-type neutron-absorbing material and an hydrogenous neutron-moderating material.

43. The apparatus of claim 37 further comprising a plurality of epithermal neutron detectors carried by the sonde in spaced-apart relation to provide an extended area of formation over which epithermal neutrons are detected, all of said detectors being shielded against borehole neutrons by said shielding means.

44. The apparatus of claim 37 wherein said detector positioning means comprises:
   a pad carried by said sonde externally of said housing, said at least one detector being mounted on said pad adjacent the outer surface thereof; and
   means for urging said outer surface of said pad into engagement with the borehole wall.

45. The apparatus of claim 37 further comprising:
   means for monitoring the output of the neutron source during one or more bursts and for generating signals representative thereof;
   means for processing said neutron source output signals to define a fiducial time window relative to the neutron burst for said processing of said plurality of epithermal neutron count rate signals, so as to compensate for the effect of any variation in the time location of the neutron burst.

46. The apparatus of claim 45 further comprising means for processing said neutron source output signals to determine the neutron burst width.

47. A method for determining the porosity of an earth formation traversed by a well borehole, comprising:
   repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;
   positioning said at least one epithermal neutron detector closely adjacent the wall of the borehole to minimize the standoff of the detector from the borehole wall;
   shielding said at least one detector against neutrons incident thereon from all directions except the formation to enhance the sensitivity of the detector to the neutrons incident thereon from the formation;
   measuring the population of detected epithermal neutrons during each of a plurality of time periods subsequent to said neutron bursts and generating a plurality of count signals representative of said respective populations; and
   processing said plurality of count signals in accordance with a predetermined relationship, including one time-constant parameter representative of the epithermal decay time and at least one additional parameter representative of the effect of detector standoff from the borehole wall, to obtain a signal correlatable with the porosity of the surrounding earth formation.

48. The method of claim 47 further comprising recording said porosity-correlatable signal as a function of depth within the borehole.

49. The method of claim 47 wherein said predetermined relationship is generally of the form $$N(t) = N_o e^{(-t/A + B/t \ldots)} + K$$

where:
   N(t) is the epithermal neutron count at time t,
   $N_o$ is the epithermal neutron count at an initial time $t_o$,
   e is the Napierian log base (2.7183),
   A is the epithermal neutron decay time constant of the earth formation,
   B is a parameter indicative of the effect of detector standoff from the borehole wall, and
   K is a function of background.

50. The method of claim 47, wherein the locus of emission of neutrons by said neutron source means and the active volume of said at least one epithermal neutron detector are located at substantially the same elevation along the logging sonde.

51. The method of claim 47 wherein said at least one epithermal neutron detector comprises an active volume filled with helium-3 gas and clad with a thermal neutron absorbing material.

52. The method of claims 47 or 51 wherein said shielding step comprises a shielding said at least one detector on all sides except that facing the formation with a 1/v-type neutron-absorbing material and an hydrogenous neutron-moderating material.

53. The method of claim 47 further comprising positioning a plurality of epithermal neutron detectors closely adjacent the borehole wall to provide an extended area of formation over which epithermal neutrons are detected, and shielding all of said detectors against borehole neutrons.

54. The method of claim 47 further comprising:
   monitoring the output of the neutron source during one or more bursts and generating signals representative thereof;
   processing said neutron source output signals to define a fiducial time window relative to the neutron burst for said processing of said plurality of epithermal neutron count rate signals, so as to compensate for the effect of any variation in the time location of the neutron burst.

55. The method of claim 54 further comprising processing said neutron source output signals to determine the neutron burst width.

56. Apparatus for epithermal decay time logging of an earth formation traversed by a well borehole, comprising:
   a sonde, having an elongate housing, adapted to be lowered into and moved through the borehole;
   neutron source means carried by the sonde for repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;
   at least one detector carried by the sonde for detecting epithermal neutrons and generating signals representative thereof, the locus of emission of neutrons by said neutron source means and the active volume of said at least one detector being located at substantially the same elevation along the logging sonde;
   means for positioning said at least one detector closely adjacent the wall of the borehole to minimize the standoff of the detector from the borehole wall;
   means for shielding said at least one detector against neutrons incident thereon from all directions except the formation to enhance the sensitivity of the detector to neutrons incident thereon from the formation;
   means coupled to said at least one detector for measuring the population of detected epithermal neutrons during each of a plurality of time periods subsequent to said neutron bursts and generating a plurality of count signals representative of said respective populations; and signal processing means for deriving from said plurality of count signals a signal representative of a standoff-compensated value of the epithermal decay time of the formation.

57. A method for epithermal decay time logging of an earth formation traversed by a well borehole, comprising:

repetitively irradiating the borehole and surrounding earth formation with discrete bursts of high energy neutrons, which neutrons interact with nuclei of the borehole and formation materials to produce corresponding repetitive populations of epithermal neutrons in the borehole and surrounding earth formation;

positioning at least one epithermal neutron detector closely adjacent the wall of the borehole to minimize the standoff of the detector form the borehole wall, and such that the locus of emission of neutrons and the locus of detection of epithermal neutrons are simultaneously at substantially the same depth in the borehole;

shielding said at least one detector against neutrons incident thereon from all directions except the formation to enhance the sensitivity of the detector to neutrons incident thereon from the formation;

measuring the population of detected epithermal neutrons during each of a plurality of time periods subsequent to said neutron bursts and generating a plurality of count signals representative of said respective populations; and deriving from said plurality of count signals a signal representative of a standoff-compensated value of the epithermal decay time of the formation.

* * * * *

UNITED STATES PATENT AND TRADEMARK OFFICE
CERTIFICATE OF CORRECTION

PATENT NO. : 4,972,082
DATED : November 20, 1990
INVENTOR(S) : William A. Loomis et al.

It is certified that error appears in the above-identified patent and that said Letters Patent is hereby corrected as shown below:

Title page, first line of Abstract, "plused" should read --pulsed--;
Title page, 3rd line of Abstract, "eptithermal" should read --epithermal--;
Title page, 3rd from bottom line of Abstract, "an" should read --and--;
Col. 1, line 50, "4,760,242" should read --4,760,252--;
Col. 7, line 2, "1.25 cm" should read --1.25mm--;
Col. 11, line 12, "an" should read --and--;
Col. 11, line 29, delete "be";
Col. 11, line 42, "time A" should read --time constant A--;
Col. 15, line 65, "of" should read --or--;
Col. 17, line 26, "desired" should read --desired,--;
Col. 23, line 50, after "epithermal" insert --neutron--;
Col. 24, line 14, before "shielding" delete "a";
Col. 26, line 1, "form" should read --from--.

Signed and Sealed this

Twenty-eighth Day of July, 1992

Attest:

DOUGLAS B. COMER

Attesting Officer     Acting Commissioner of Patents and Trademarks